United States Patent [19]

Danzer et al.

[11] 3,942,177
[45] Mar. 2, 1976

[54] INTERFEROMETER RADAR ELEVATION ANGLE MEASUREMENT APPARATUS

[75] Inventors: Paul M. Danzer, Norwalk; Giles E. Rae, Ridgefield, both of Conn.

[73] Assignee: United Technologies Corporation, Hartford, Conn.

[22] Filed: July 28, 1971

[21] Appl. No.: 166,754

[52] U.S. Cl. .................. 343/16 M; 343/100 TD
[51] Int. Cl. .................................. G01s 9/22
[58] Field of Search ......... 343/16 M, 16 R, 100 TD, 343/100 SA

[56] References Cited
UNITED STATES PATENTS

| | | | |
|---|---|---|---|
| 3,181,160 | 4/1965 | Pichafroy | 343/16 M |
| 3,309,701 | 3/1967 | Bollinger et al. | 343/16 M |
| 3,394,374 | 7/1968 | Weiss | 343/100 TD |
| 3,438,044 | 4/1969 | Elia et al. | 343/16 M |

Primary Examiner—Benjamin A. Borchelt
Assistant Examiner—G. E. Montone
Attorney, Agent, or Firm—M. P. Williams

[57] ABSTRACT

In the measurement of the phase difference (proportional to the elevation angle of a target) provided by the radar target signals that are received by each antenna of an antenna array, a comparison of the responses of the signal processing circuitry to the radar target signals and to two signals with an adjustable known phase difference, causes the known phase difference to change until the result of the comparison is a null. The known phase difference, at the time that the comparison provides a null, is equal to the phase difference provided by the radar target signals and is independent of phase errors introduced by the processing circuitry.

4 Claims, 1 Drawing Figure

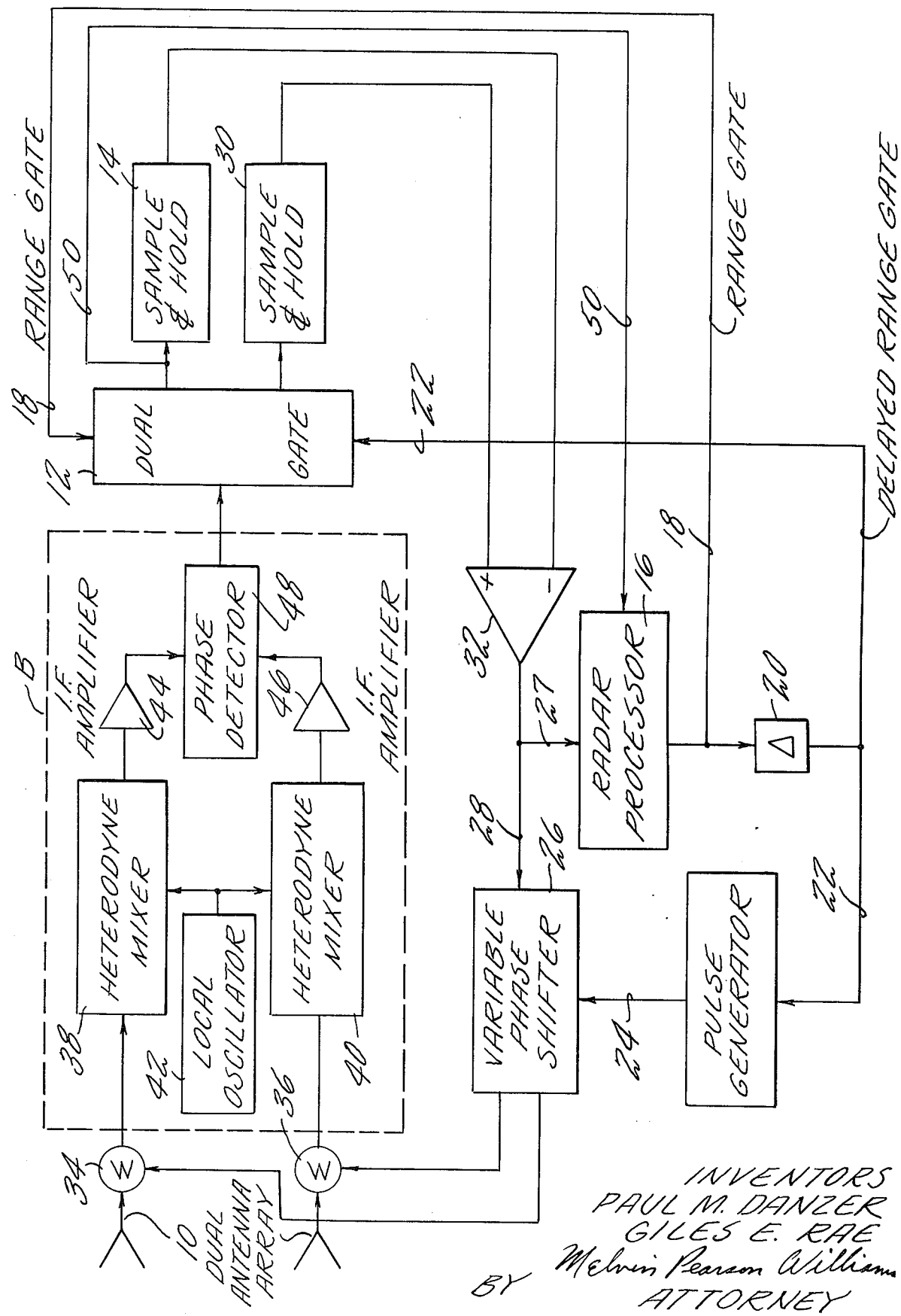

INTERFEROMETER RADAR ELEVATION ANGLE MEASUREMENT APPARATUS

BACKGROUND OF THE INVENTION

1. Field of Invention

This invention relates to radar systems and more particularly to improving the accuracy of the determination of the elevation angle of a target.

2. Description of the Prior Art

Phase interferometer radar, because of its high degree of versatility, is particularly suited for use in airborne radar systems. The phase interferometer radar can simultaneously provide angular elevation and azimuth target coverage, and a large span of range coverage at a data rate of less than one second for all of the aforementioned data.

The elevation angle that is subtended by a target is obtained by receiving a target return signal on a dual antenna array and is proportional to the phase difference between the target signals received by each antenna. The dual antenna array provides the target's elevation angle because the antennas are geometrically arranged so that only a target return signal at an elevation angle of zero arrives at both antennas simultaneously, and the time differential of the incidence of the target signals at each antenna is a known function of the elevation angle of the target.

Radar signals are typically in the microwave frequency spectrum, where signal amplification and the determination of phase difference is difficult. For this reason, the target signal received at each antenna of the array is heterodyned with a local oscillator, thereby providing two intermediate frequency signals which still maintain the same phase difference as the originally received target signals. The intermediate frequency signals (on the order of 30 megahertz) are each amplified and applied to the inputs of a phase detector which provides a signal proportional to the phase difference of the target signals and therefore to target elevation angle. However, the circuitry that is used for heterodyning, amplifying and phase detecting may cause an unequal phase shift of each intermediate frequency signal and thereby cause an error in the measurement of the elevation angle of a target.

SUMMARY OF THE INVENTION

The object of the present invention is to provide improved radar apparatus for accurately measuring a target's elevation angle.

According to the present invention, in response to two target signals with a parametric difference proportional to the elevation angle of a target, a comparison of said parametric difference with an adjustable known parametric difference between two pseudo target signals causes a change of said known difference so that the result of said comparison is a null, thereby causing the difference of said target signals to be known and equal to the difference of said pseudo target signals.

In accordance with the invention of one form, in response to two target signals with a phase difference proportional to the elevation angle of a target, a comparision of said phase difference with an adjustable known phase difference between two pseudo target signals causes a change of said known phase difference so that the result of said comparison is a null, thereby causing the phase difference of said target signals to be known and equal to the phase difference of said pseudo target signals.

For a phase interferometer radar, where the parametric difference is a phase difference, the present invention eliminates target elevation measurement errors, which are the result of unwanted phase shift introduced by circuitry that is used for processing target signals.

Other objects, features and advantages of the present invention will become more apparent in the light of the following detailed description of a preferred embodiment thereof as illustrated in the accompanying drawing.

BRIEF DESCRIPTION OF THE DRAWING

The sole FIGURE herein is a schematic block diagram of a preferred embodiment of the invention.

DESCRIPTION OF THE PREFERRED EMBODIMENT

Referring now to the drawing, a radar target return signal received by a dual antenna array 10 generates a target signal on each antenna. The phase difference of the two target signals is proportional to the elevation angle of the target because of the disposition of the antennae in the array 10. In response to the target signals, a dual gate 12, in series with a signal processing apparatus 13, provides a signal level proportional to the target's elevation angle which is applied to the input of a first sample and hold circuit 14. The signal is stored and provided as an output by the first sample and hold circuit 14 until the dual gate 12 provides a signal associated with a succeeding radar target return signal.

A radar processor 16 provides a range gate pulse on a signal line 18, which is connected to a delay unit 20 and the dual gate 12. In response to a pulse on the signal line 18, the delay unit 20 provides a delayed range gate pulse on a signal line 22 a short time after the occurrence of the range gate pulse. In response to a pulse on the signal line 22, a pulse generator 24 provides a pseudo radar target return signals to a variable phase shifter 26, which simulates a dual antenna array by providing a pair of phase shifted pseudo target signals at its output. The phase difference of the pseudo signal provided by the variable phase shifter 26, is in response and in proportion to an input signal provided on a signal line 28. A signal level proportional to the phase difference of the pseudo signals is provided by the dual gate 12 to a second sample and hold circuit 30, which in turn provides the signal level as an output, storing and continuing to provide as an output the signal level present at the end of the pseudo return signal; each succeeding pseudo return signal causes an iteration of the aforementioned sample and hold sequence. The outputs of the sample and hold circuits 14, 30, which are signal levels proportional to the phase differences of the target signals and the pseudo signals respectively, are connected to the inputs of a difference amplifier 32. The amplifier 32 is a high gain device which compares the two signal levels and amplifies their difference. The variable phase shifter 28 responds to the signal provided by the difference amplifier 32 by changing the phase difference of the pseudo signals in a direction to cause the difference between the outputs of the sample and hold circuits 14, 30 to be a null.

Since the pseudo signals and the target signals are both processed by the signal processing apparatus 13, erroneous phase shifts that are introduced by the processing apparatus 13 result in identical errors being provided to the sample and hold circuits 14, 30. However, errors that are common to the outputs of the sample and hold circuits 14, 30 are subtracted one from the other by the amplifier 32. Therefore, a differential null at the outputs of the sample and hold circuits 14, 30 only occurs because the phase difference of the pseudo signals and the phase difference of the target signals are equal and the error is cancelled.

The phase shifter 26 is a device with a known transfer characteristic so that the phase difference of the pseudo signals is in a known relationship to the input signal on the line 28. Since the pseudo signals and the target signals have equal phase differences, the input signal has the same known relationship to the phase difference of the target signals. This input signal, representative of a target's elevation angle, is provided to the radar processor 16 on a signal line 27, where it may be further utilized as fire control or navigational information, or for any other suitable purpose.

The variable phase shifter 26 may comprise a variable length delay line wherein an array of diodes causes the length of the delay line to vary in response to an input signal. This type of variable phase shifter is well known in the prior art. Other known variable shifters may also be adapted for use in the embodiment of the invention.

Couplers 34, 36 couple the target signals from the antenna 10 and the pseudo signals from the variable phase shifter 26, into the signal processing apparatus 13. The couplers 34, 36 are well known microwave devices, often of a cavity construction or constructed from a ferrite material, which provide unidirectional transmission paths at microwave frequencies.

The elements included in the signal processing apparatus 13 are well known to those skilled in the art, as is the application of those elements in this embodiment. Heterodyne mixers 38, 40 heterodyne the target and pseudo signals, which are typically in the Ku microwave band, with a signal from a local oscillator 42. Heterodyning is a nonlinear technique for obtaining a signal having an intermediate frequency (called the I.F. frequency, typically on the order of 30 megahertz) equal to the difference of the frequencies of an input signal and a local oscillator, thereby providing a signal in a lower frequency spectrum, which simplifies further processing. The phase difference between the output signals and the input signals of the mixers 38, 40 remain substantially the same, and a pair of I.F. amplifiers 44, 46 amplify the signals provided by the mixers 38, 40 and apply the amplified signals to inputs of a phase detector 48. The phase detector 48 is a well known device, such as a synchronous demodulator, which provides a signal level proportional to the phase difference of two applied signals. The output of the phase detector 48 is one of the three inputs that are applied to the dual gate 12; other inputs are the range gate pulse provided on the line 18 and the delayed range gate pulse on the line 22.

The dual gate 12, upon the application of the range gate pulse on the line 18, connects the output of the phase detector 48 to the input of the first sample and hold circuit 14. The time that a range gate pulses is initiated on the line 44 is associated, in the usual well-known manner, with the range of a radar target. The target's azimuth is associated with the orientation of the antenna 10 (performed mechanically) at the time that the radar target signal is received.

Upon the application of the delayed range gate pulse on the line 22, the dual gate 12 connects the output of the phase detector 48 to the input of the second sample and hold circuit 30. The output of the phase detector 48, for the duration of the pulse on the line 22, is proportional to the phase difference of the pseudo signals, since the same pulse also causes the pulse generator 24 to generate the pseudo return signal.

The embodiment of the present invention just described is particularly suited (though not limited) to the "lock-on" mode of operation of a radar system. In the lock-on mode, target signals are received from a single target so that the rate of change of a target's elevation angle is relatively low and there is a correspondingly low slewing rate of the variable phase shifter 26. In a "search" mode of operation, a plurality of targets may provide target signals at different elevation angles thereby requiring a much higher slewing rate. In the search mode of operation, it may be desirable to obtain the target's elevation angle directly from the dual gate 12 via a signal line 50.

It should be understood that the invention may be used in radar systems employing other parameters, such as an amplitude difference of the target return signal, for measuring the angle of elevation of the target. The important aspect is in the use of a known pseudo signal in the differential processing to derive an angle indication free of error in the parameter being measured.

Although the invention has been shown and described with respect to a preferred embodiment thereof, it should be understood by those skilled in the art that the foregoing and various other changes and omissions in the form and detail thereof may be made therein without departing from the spirit and the scope of the invention.

Having thus described a typical embodiment of our invention, that which we claim as new and desire to secure by Letters Patent of the United States is:

1. Apparatus for providing a signal proportional to the elevation angle of a target in response to target signals from a dual antenna array of a range gated radar apparatus, said radar apparatus including processing means for generating first signals representative of a signal parameter difference between the target return signal at each antenna of said array, said parameter difference relating to the elevation angle of the target with respect to the array, and including means for providing a time shifted pair of pulses for each range gate, comprising:

means responsive to one of said pair of pulses for generating pseudo target signals having a controlled simulated variable parameter difference, as an alternative input to said processing means, said processing means additionally providing a second signal representative of said parameter difference of said pseudo signals;

gating means, concurrently responsive to said time shifted pair of pulses and signals provided by said processing means, for coincidently providing third and fourth signals, each proportional to related ones of said first and second signals, respectively; and means comparing said third and fourth signals for providing a fifth signal, representative of said parameter difference of said pseudo signals, causing said parameter difference to vary, in response to said fifth signal, in a manner tending to cause said third and fourth signals to be substantially equal.

2. Apparatus according to claim 1 wherein said gating means comprises:

means, including a dual gate, concurrently responsive to one of said pair of pulses and said first signal for providing a target elevation signal, and concurrently responsive to the other of said pair of pulses and said second signal for providing a pseudo target elevation signal; and storage means responsive to said elevation signals for coincidently providing said third and fourth signals.

3. Apparatus for providing a signal proportional to the elevation angle of a target in response to target signals from a dual antenna array of a range gated radar apparatus, said radar apparatus including processing means for generating first signals representative of a phase difference between the target return signal at each antenna of said array, said phase difference relating to the elevation angle of the target with respect to the array, and including means for providing a time shifted pair of pulses for each range gate, comprising:

generating means responsive to one of said pair of pulses for generating pseudo target signals having a controllable simulated variable phase difference, as an alternative input to said processing means, said processing means additionally providing a second signal representative of said phase difference of said pseudo signals;

gating and storage means, concurrently responsive to said time shifted pair of pulses and signals provided by said processing means, for coincidently providing third and fourth signals, each proportional to related ones of said first and second signals, respectively; and means comparing said third and fourth signals for providing a fifth signal, representative of said phase difference of said pseudo signals and connected to said generating means, for causing said phase difference to vary in response to said fifth signal, in a manner tending to cause said third and fourth signals to be equal.

4. Apparatus according to claim 3 wherein said generating means comprises:

a differential amplifier which amplifies the difference between said third and fourth signals; and means including a variable phase shifter, which provides pseudo signals having a phase difference responsive to the output of said amplifier, the phase difference of the pseudo signals changing in a direction which causes the difference between said third and fourth signals to tend towards a null, in response to a change in the output of said amplifier.

* * * * *